(12) United States Patent
Ishii

(10) Patent No.: US 10,738,715 B2
(45) Date of Patent: Aug. 11, 2020

(54) VALVE DEVICE

(71) Applicant: MIKUNI CORPORATION, Tokyo (JP)

(72) Inventor: Toshiaki Ishii, Kanagawa (JP)

(73) Assignee: MIKUNI CORPORATION, Tokyo (JP)

(*) Notice: Subject to any disclaimer, the term of this patent is extended or adjusted under 35 U.S.C. 154(b) by 0 days.

(21) Appl. No.: 16/098,872

(22) PCT Filed: Apr. 7, 2017

(86) PCT No.: PCT/JP2017/014439
§ 371 (c)(1),
(2) Date: Nov. 5, 2018

(87) PCT Pub. No.: WO2017/199624
PCT Pub. Date: Nov. 23, 2017

(65) Prior Publication Data
US 2019/0195146 A1 Jun. 27, 2019

(30) Foreign Application Priority Data
May 17, 2016 (JP) .................................. 2016-098685

(51) Int. Cl.
*F02D 9/10* (2006.01)
*F16K 1/226* (2006.01)
(Continued)

(52) U.S. Cl.
CPC ............ *F02D 9/1095* (2013.01); *F02D 9/04* (2013.01); *F02D 9/10* (2013.01); *F02D 9/101* (2013.01);
(Continued)

(58) Field of Classification Search
USPC .................................................. 251/305–308
See application file for complete search history.

(56) References Cited

U.S. PATENT DOCUMENTS 3,941,151 A * 3/1976 Biddle ...................... E03F 5/08
137/527.6
5,265,846 A * 11/1993 Shreve .................. F16K 35/025
251/188
(Continued)

FOREIGN PATENT DOCUMENTS

CN 101349222 1/2009
JP H06229261 8/1994
(Continued)

OTHER PUBLICATIONS

"International Search Report (Form PCT/ISA/210)" of PCT/JP2017/014439, dated Jun. 13, 2017, with English translation thereof, pp. 1-4.
(Continued)

*Primary Examiner* — John Fox
(74) *Attorney, Agent, or Firm* — JCIPRNET

(57) ABSTRACT

This valve device includes a body having passages and valve shaft holes, a valve shaft passed through the valve shaft holes in a rotatable manner, and butterfly valves. The butterfly valves include first contour parts and second contour parts forming outer contour parts that are smaller than the first contour parts. The first and second contour parts are fixed to the valve shaft in order to close off the passages at positions set apart from the valve shaft holes toward the downstream side (upstream side) of the passages, and are disposed flanking a straight line parallel to the valve shaft to form prescribed outer contour parts. The body includes first seal parts with which the first contour parts are brought into contact and second seal parts with which the second contour parts are brought into contact within the passages. Fluid leakage in a closed state can thereby be reliably prevented.

6 Claims, 13 Drawing Sheets

(51) Int. Cl.
*F16K 1/22* (2006.01)
*F02D 9/04* (2006.01)
*F16K 3/08* (2006.01)
*F16K 3/10* (2006.01)
*F01N 5/02* (2006.01)

(52) U.S. Cl.
CPC ............... *F02D 9/106* (2013.01); *F16K 1/22* (2013.01); *F16K 1/226* (2013.01); *F16K 3/08* (2013.01); *F16K 3/10* (2013.01); *F01N 5/02* (2013.01)

(56) References Cited

U.S. PATENT DOCUMENTS

| | | | | |
|---|---|---|---|---|
| 5,630,571 | A | * | 5/1997 | Kipp .................. F02D 9/06 251/214 |
| 5,673,895 | A | * | 10/1997 | Kaneko .............. F16K 1/2268 251/305 |
| 5,836,152 | A | | 11/1998 | Schatz |
| 6,273,119 | B1 | * | 8/2001 | Foster .................. F02D 9/04 137/15.25 |
| 8,136,793 | B2 | * | 3/2012 | Keller-Staub ........... F16K 51/02 123/336 |
| 2010/0148107 | A1 | | 6/2010 | Keller-Staub |
| 2013/0299728 | A1 | * | 11/2013 | Yokoyama ............ F16K 1/2263 251/306 |

FOREIGN PATENT DOCUMENTS

| | | |
|---|---|---|
| JP | H07217458 | 8/1995 |
| JP | H09511811 | 11/1997 |
| JP | 2006125569 | 5/2006 |
| JP | 2010139073 | 6/2010 |
| JP | 5279968 | 9/2013 |

OTHER PUBLICATIONS

"Office Action of Japan Counterpart Application", dated Feb. 19, 2020, pp. 1-5.

"Office Action of Japan Counterpart Application", dated Feb. 19, 2020, with English translation thereof, pp. 1-11.

* cited by examiner

VALVE DEVICE

CROSS-REFERENCE TO RELATED APPLICATION

This application is a 371 application of the international PCT application serial no. PCT/JP2017/014439, filed on Apr. 7, 2017, which claims the priority benefit of Japan application no. 2016-098685, filed on May 17, 2016. The entirety of each of the above-mentioned patent applications is hereby incorporated by reference herein and made a part of this specification.

TECHNICAL FIELD

The present invention relates to a valve device that includes butterfly valves that open and close passages for causing a fluid to pass therethrough, and for example, a valve device that is applied to opening and closing of passages that causes a fluid at a high temperature to pass therethrough, such as an exhaust system for an engine.

BACKGROUND ART

As a conventional valve device, a valve device that includes a housing that has a fluid passage, a valve shaft that is held by the housing in a rotatable manner, a butterfly valve with a circular plate shape that is secured to the valve shaft and opens and closes the fluid passage, and two semicircular-arc-shaped sheet parts that are formed to protrude from an inner surface of the fluid passage such that the butterfly valve is brought into contact with the semicircular-arc-shaped sheet parts dining closure, and the like is known (see Patent Literature 1, for example).

In this valve device, contact surfaces of the sheet parts with which the butterfly valve is brought into contact are disposed at positions that overlap with bearing holes of the valve shaft in an extending direction of the fluid passage. Therefore, it is not possible to provide the sheet part in ranges in which the valve shaft and the butterfly valve rotate.

In addition, although a covering part that is continuous with the sheet parts is provided to partially cover the circumference of the valve shaft, it is not possible to cover the entire circumference of the valve shaft.

Therefore, there is a concern that fluid leakage may occur from the upstream side toward the downstream side in the region where the sheet parts and the covering part are not present.

In addition, another valve device that includes a housing that has a fluid passage, a valve shaft that is held by the housing in a rotatable manner, a circular plate-shaped butterfly valve that is secured to the valve shaft via a spacer to open and close the fluid passage, two arc-shaped stepped surfaces that are formed in an inner circumferential surface of the fluid passage with which the butterfly valve is brought into contact during closure, and the like is known (see Patent Literature 2, for example).

In this valve device, the stepped surface with which the butterfly valve is brought into contact is disposed at a position set apart from a bearing hole of the valve shaft in an extending direction of the fluid passage, and the butterfly valve is secured to the valve shaft at a position deviating from the rotation center of the valve shaft by a prescribed amount.

Therefore, in order for the butterfly valve to be able to rotate to a closing position, it is not possible to provide the stepped surface such that an outer edge (diameter part) of the butterfly valve does not interfere with the stepped surface in a region in the vicinity of the valve shaft in which the butterfly valve is turned.

Therefore, there is a concern that fluid leakage may occur from the upstream side toward the downstream side in the region where the stepped surface is not present.

CITATION LIST

Patent Literature

[Patent Literature 1]
  Japanese Patent No. 5279968
[Patent Literature 2]
  Japanese Unexamined Patent Application Publication No. H7-217458

SUMMARY OF INVENTION

Technical Problem

The present invention was made in view of the aforementioned circumstances, and an objective thereof is to provide a valve device that solves the problems in the related art and is capable of preventing fluid leakage with a simple structure.

Solution to Problem

According to the present invention, there is provided a valve device that has a configuration including: a body that has a passage that a fluid is caused to pass through and a valve shaft hole; a valve shaft that passes through the valve shaft hole in a rotatable manner; and a butterfly valve that opens and closes the passage, in which the butterfly valve includes a first contour part and a second contour part that forms an outer contour that is smaller than the first contour part, the first contour part and the second contour part are secured to the valve shaft to close the passage at a position set apart from the valve shaft hole toward an upstream side or a downstream side of the passage, and are disposed to flank a straight line parallel to the valve shaft to form prescribed outer contours, and the body includes a first seal part with which the first contour part is brought into contact and a second seal part with which the second contour part is brought into contact within the passage.

In the aforementioned configuration, a configuration in which the passage is formed to have a circular section with a prescribed center, the first contour part is formed into a semicircular plate shape with a prescribed radius, and the second contour part is formed into a semicircular plate shape with a smaller radius than the radius of the first counter part may be employed.

In the aforementioned configuration, a configuration in which the butterfly valve includes a straight line part that connects an outer contour of the first contour part and an outer contour of the second contour part, and the body includes a flat part with which the straight line part of the butterfly valve is brought into close contact during closure of the passage may be employed.

In the aforementioned configuration, a configuration in which straight line part is positioned on the straight line that is parallel to the valve shaft and passes through a center of the passage may be employed.

In the aforementioned configuration, a configuration in which the body has a relief part that is formed into a curved shape and is continuous with the flat part along an outer circumferential surface of the valve shaft in the vicinity of the second seal part may be employed.

In the aforementioned configuration, a configuration in which the body has a main passage and a sub passage that cause a fluid to pass therethrough and the valve shaft hole that is formed to cause the main passage and the sub passage to communicate with each other, a main butterfly valve that opens and closes the main passage and a sub butterfly valve that opens and closes the sub passage in a phase opposite to a phase of the main butterfly valve are secured to the valve shaft, the main butterfly valve is arranged to close the main passage at a position set apart from the valve shaft holes toward a downstream side of the passage, and the sub butterfly valve is arranged to close the sub passage at a position set apart from the valve shaft holes toward an upstream side of the passage may be employed.

In the aforementioned configuration, a configuration in which the valve shaft is supported at both ends thereof in a rotatable manner via bearings attached to the body may be employed.

In the aforementioned configuration, a configuration which further includes a biasing member that biases the valve shaft toward one side in an axial direction thereof may be employed.

Advantageous Effects of Invention

According to the valve device with the aforementioned configuration, it is possible to achieve a simple structure and to reliably prevent fluid leakage from the upstream side toward the downstream side during closure in a region in the vicinity of the valve shaft hole without leading to an increase in the number of components.

DESCRIPTION OF EMBODIMENTS

Figure 1A:
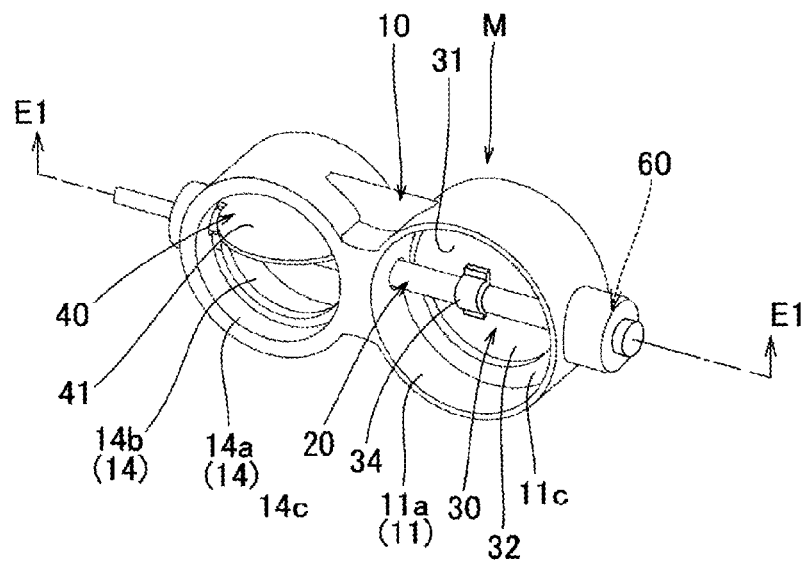
FIG. 1A illustrates an embodiment of a valve device according to the present invention and is an exterior perspective view of the valve device in a state in which a main butterfly valve closes a main passage while a sub butterfly valve opens a sub passage.
Figure 1B:
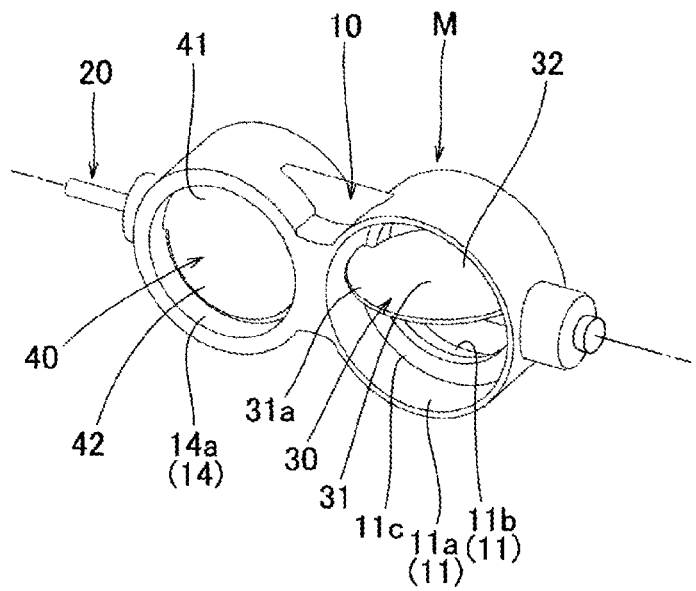
FIG. 1B illustrates an embodiment of the valve device according to the present invention and is an exterior perspective view of the valve device in a state in which the main butterfly valve opens the main passage while the sub butterfly valve closes the sub passage.

Hereinafter, an embodiment of the present invention will be described with reference to the accompanying drawings.

A valve device M according to the embodiment includes a body 10, a valve shaft 20, a main butterfly valve 30 and a sub butterfly valve 40 as butterfly valves, two bearings 50, and a biasing member 60 (a cylindrical holder 61, a spring 62, a ball 63) as illustrated in FIGS. 1 to 7B.

The body 10 includes a main passage 11 that serves as a passage for causing a fluid to pass therethrough, a first seal part 12 and a second seal part 13 that are formed in the main passage 11, a sub passage 14 that serves as a passage for causing the fluid to pass therethrough, a first seal part 15 and a second seal part 16 that are formed in the sub passage 14, valve shaft holes 17a, 17b, and 17c through which the valve shaft 20 is caused to pass, two fitting holes 18a to which bearings 50 are attached, an attachment recessed part 18b to which a biasing member 60 is attached, an upstream-side flange part 19a, and a downstream-side flange part 19b.

The main passage 11 is formed to include an upstream-side passage 11a that has a circular section with a prescribed inner diameter D1 around an axial line L1 at a center and a downstream-side passage 11b that has a circular section with a prescribed inner diameter D2 (D1>D2) around the axial line L1 at the center.

The first seal part 12 is formed at a position set apart from the valve shaft holes 17a, 17b, and 17c toward the downstream side of the main passage 11.

That is, the first seal part 12 is formed into a semicircular-arc-shaped stepped surface that serves as a boundary between the upstream-side passage 11a and the downstream-side passage 11b and that faces the upstream side, and a surface outer edge 31a of a first contour part 31 of the main butterfly valve 30 is brought into contact with the first seal part 12.

The second seal part 13 is formed at a position set apart from the valve shaft holes 17a, 17b, and 17c toward the downstream side of the main passage 11.

That is, the second seal part 13 is formed into a semicircular-arc-shaped stepped surface that faces the downstream side at a projecting wall 11c that serves as a boundary between the upstream-side passage 11a and the downstream-side passage 11b, a surface outer edge 32a of a second contour part 32 of the main butterfly valve 30 is brought into contact with the second seal part 13.

Figure 7A:
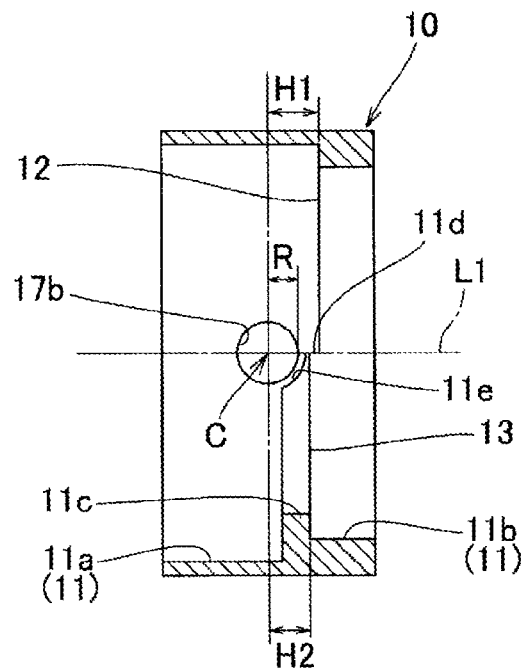
FIG. 7A is a sectional view illustrating the inside of the passage of the body that is included in the valve device illustrated in FIGS. 1A and 1B and is a sectional view taken along E3-E3 in FIG. 6.

Here, the first seal part 12 is formed at a position deviating from a center line C of the valve shaft holes 17a, 17b, and 17c toward the downstream side by a distance H1 that is slightly longer than a radius dimension R of the valve shaft holes 17a, 17b, and 17c as illustrated in FIG. 7A.

The second seal part 13 is formed at a position deviating from the center line C of the valve shaft holes 17a, 17b, and 17c toward the downstream side by a distance H2 (H2<H1) that is slightly longer than the radius dimension R of the valve shaft holes 17a, 17b, and 17c as illustrated in FIG. 7A.

The difference between the amounts of deviation (H1-H2) corresponds to a plate thickness dimension of the main butterfly valve 30.

In addition, the first seal part 12 and the second seal part 13 are formed to be divided into two parts by a straight line, which is parallel to the center line C of the valve shaft holes 17a, 17b, and 17c and passes through the axial line L1 of the main passage 11, at the boundary.

Further, a flat part 11d is formed at the boundary between the first seal part 12 and the second seal part 13, and a relief part 11e is formed to be continuous with the flat part 11d, in the main passage 11.

The flat part 11d is positioned on the straight line that is parallel to the center line C of the valve shaft holes 17a, 17b, and 17c and passes through the axial line L1 of the main passage 11 and is also formed such that the straight line part 33 of the main butterfly valve 30 is brought into close contact with the flat part 11d during closure.

In this manner, it is possible to obtain a form in which there is no gap from an inner wall of the main passage 11 over the entire outer contour of the main butterfly valve 30 and to thereby more reliably close the main passage 11.

The relief part 11e is formed into a curved shape along an outer circumferential surface of the valve shaft 20 by cutting off a part of a projecting wall 11c in the vicinity of the second seal part 13.

In this manner, it is possible to provide the closure position of the main butterfly valve 30 in the vicinity of the valve shaft holes 17a and 17b while set apart from the valve shaft holes 17a and 17b.

Therefore, it is possible to reduce a moment of inertia of the main butterfly valve 30 around the center line C of the valve shaft 20 and to achieve smooth opening and closing operations of the main butterfly valve 30.

The sub passage 14 is formed to include an upstream-side passage 14a that has a circular section with a prescribed inner diameter D1' around an axial line L2 at the center and a downstream-side passage 14b that has a circular section with a prescribed inner diameter D2' (D1'<D2") around the axial line L2 at the center.

The first seal part 15 is formed at a position set apart from the valve shaft holes 17a, 17b, and 17c toward the downstream side of the sub passage 14.

That is, the first seal part 15 is formed as a semicircular-arc-shaped stepped surface that serves as a boundary between the upstream-side passage 14a and the downstream-side passage 14b and faces the downstream side, and a surface outer edge 41a of the first contour part 41 of the sub butterfly valve 40 is brought into contact with the first seal part 15.

The second seal part 16 is formed at a position set apart from the valve shaft holes 17a, 17b, and 17c toward the upstream side of the sub passage 14.

That is, the second seal part 16 is formed as a stepped surface that faces the upstream side at the projecting wall 14c that serves as a boundary between the upstream-side passage 14a and the downstream-side passage 14b, and a surface outer edge 42a of the second contour part 42 of the sub butterfly valve 40 is brought into contact with the second seal part 16.

Figure 7B:
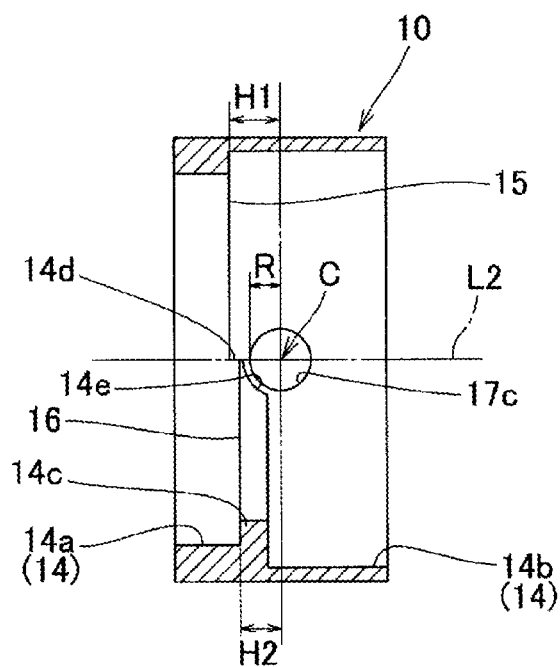
FIG. 7B is a sectional view illustrating the inside of the passage of the body that is included in the valve device illustrated in FIGS. 1A and 1B and is a sectional view taken along E4-E4 in FIG. 6.

Here, the first seal part 15 is formed at a position deviating from the center line C of the valve shaft holes 17a, 17b, and 17c toward the upstream side by the distance H1 that is slightly longer than the radius dimension R of the valve shaft holes 17a, 17b, and 17c as illustrated in FIG. 7B.

As illustrated in FIG. 7B, the second seal part 16 is formed at a position deviating from the center line C of the valve shaft holes 17a, 17b, and 17c toward the downstream side by the distance H2 (H2<H1) that is slightly longer than the radius dimension R of the valve shaft holes 17a, 17b, and 17c.

The difference (H1-H2) between the amounts of deviation corresponds to the plate thickness dimension of the sub butterfly valve 40.

In addition, the first seal part 15 and the second seal part 16 are formed to be divided into two by a straight line parallel to the center line C of the valve shaft holes 17a, 17b, and 17c that passes through the axial line L2 of the sub passage 14 at the boundary.

Further, a flat part 14d is formed at the boundary between the first seal part 15 and the second seal part 16, and a relief part 14e is formed to be continuous with the flat part 14d in the sub passage 14.

The flat part 14d is positioned on the straight line that is parallel to the center line C of the valve shaft holes 17a, 17b, and 17c and passes through the axial line L2 of the sub passage 14 such that the straight line part 43 of the sub butterfly valve 40 is brought into close contact with the flat part 14d during closure.

In this manner, it is possible to obtain a form in which there is no gap from an inner wall of the sub passage 14 over the entire outer contour of the sub butterfly valve 40 and to thereby more reliably close the sub passage 14.

The relief part 14e is formed to be curved along an outer circumferential of the valve shaft 20 by cutting off a part of the projecting wall 14c in the vicinity of the second seal part 16.

In this manner, it is possible to provide the closure position of the sub butterfly valve 40 in the vicinity of the valve shaft holes 17b and 17c while set apart from the valve shaft holes 17b and 17c.

Therefore, it is possible to reduce the moment of inertia of the sub butterfly valve 40 around the center line C of the valve shaft 20 and to achieve smooth opening and closing operations of the sub butterfly valve 40.

The valve shaft holes 17a, 17b, and 17c are formed to be aligned on the center line C that vertically extends with respect to the axial liens L1 and 2.

The valve shaft hole 17a is formed into a cylindrical shape that communicates with the main passage 11 from the outside on one side of the body 10 and that has an inner diameter dimension (2R) into which one end part 21 of the valve shaft 20 is fitted in a rotatable manner.

The valve shaft hole 17b is formed into a cylindrical shape that causes the main passage 11 and the sub passage 14 to communicate with each other at an intermediate part of the body 10 and that has an inner diameter dimension (2R) into which an intermediate part 22 of the valve shaft 20 is fitted in a rotatable manner.

The valve shaft hole 17c is formed into a cylindrical shape that communicates with the sub passage 14 from the outside on the other side of the body 10 and that has an inner diameter dimension (2R) into which another end part 23 of the valve shaft 20 is fitted in a rotatable manner.

The fitting holes 18a are formed into a cylindrical shape that has an inner dimension with which the bearing 50 is fixedly fitted with no gap.

The attachment recessed part 18b is formed to have an inner diameter with which the cylindrical holder 61 with the ball 63 and the spring 62 accommodated therein is fixedly fitted or is formed into a female screw which is fixedly fitted onto the cylindrical holder 61.

The valve shaft 20 is formed into a columnar shape that extends coaxially with the center line C of the valve shaft holes 17a, 17b, and 17c.

The valve shaft 20 includes the one end part 21, the intermediate part 22, and the other end part 23 that have the same outer diameter dimensions, a reduced diameter part 24 that is formed outside the one end part 21, a reduced diameter part 25 that is formed outside the other end part 23, and a coupling part 26 that is formed at a tip end of the reduced diameter part 25.

The one end part 21, the intermediate part 22, and the other end part 23 are formed to respectively have outer diameter dimensions with which they are respectively fitted into the valve shaft holes 17a, 17b, and 17c of the body 10 in a rotatable manner.

The valve shaft 20 is formed such that the main butterfly valve 30 is secured between the one end part 21 and the intermediate part 22 and the sub butterfly valve 40 is secured between the intermediate part 22 and the other end part 23 in a state in which a rotation phase is shifted by 90 degrees relative to the main butterfly valve 30.

That is, the main butterfly valve 30 that opens and closes the main passage 11 is secured to the valve shaft 20, and the sub butterfly valve 40 that opens and closes the sub passage 14 is also secured in a phase opposite to that of the main butterfly valve 30.

The reduced diameter parts 24 and 25 are supported in a rotatable manner by the bearings 50 attached to the fitting holes 18a of the body 10.

The coupling part 26 is formed such that an external drive source (not illustrated) is coupled thereto and rotation drive force is applied thereto.

Figure 3A:
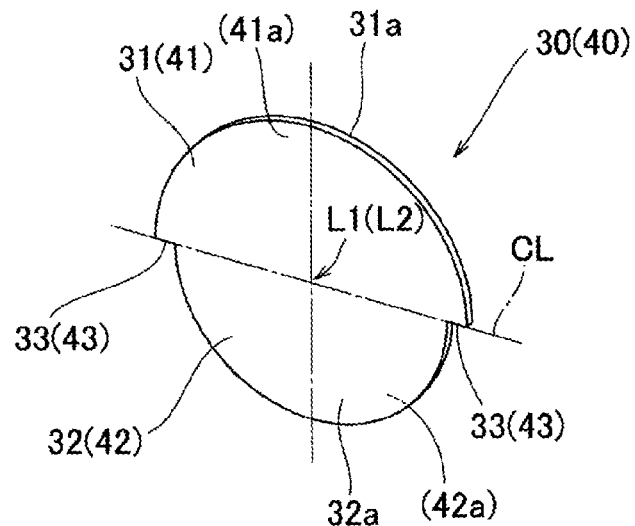
FIG. 3A is an exterior perspective view illustrating the main butterfly valve and the sub butterfly valve as the butterfly valves that are included in the valve device illustrated in FIGS. 1A and 1B.
Figure 3B:
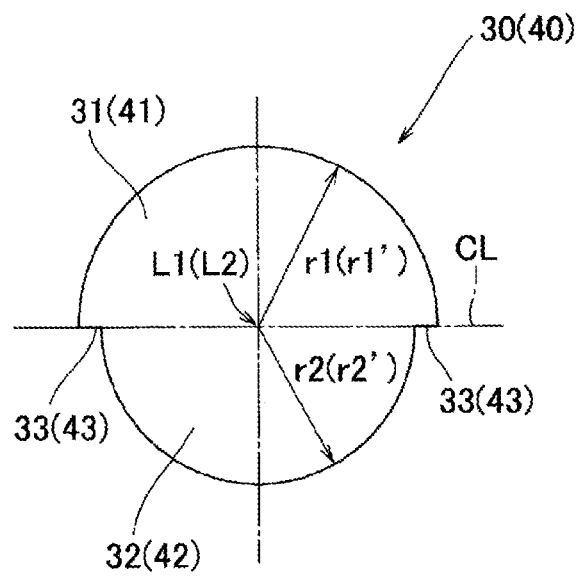
FIG. 3B is a front view illustrating the main butterfly valve and the sub butterfly valve as the butterfly valves that are included in the valve device illustrated in FIGS. 1A and 1B.
Figure 4A:
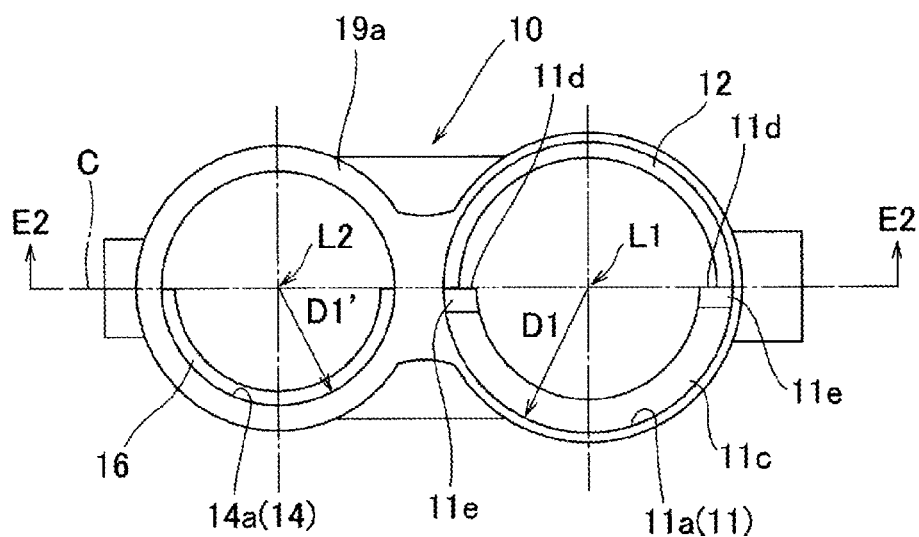
FIG. 4A illustrates a body that is included in the valve device illustrated in FIGS. 1A and 1B and is a front view of the body when viewed from the upstream side of a passage.
Figure 4B:
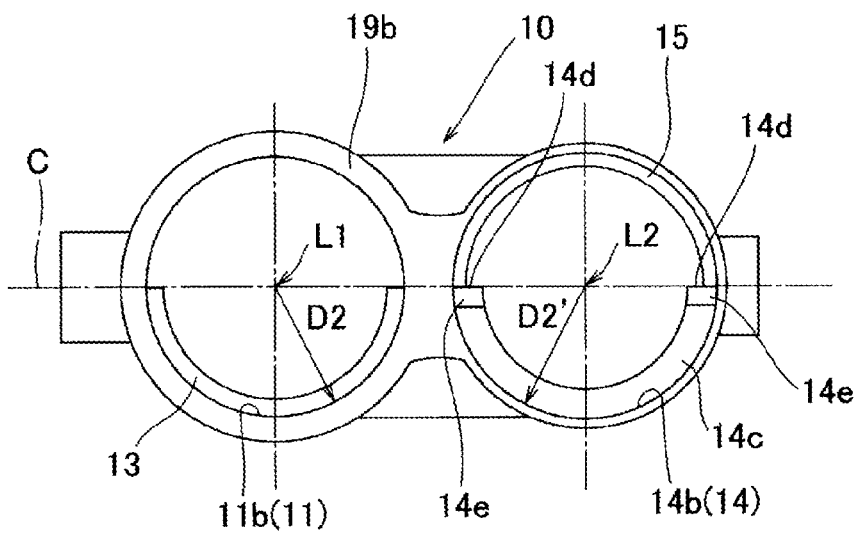
FIG. 4B illustrates the body that is included in the valve device illustrated in FIGS. 1A and 1B and is a back view of the body when viewed from the downstream side of the passage.
Figure 5:
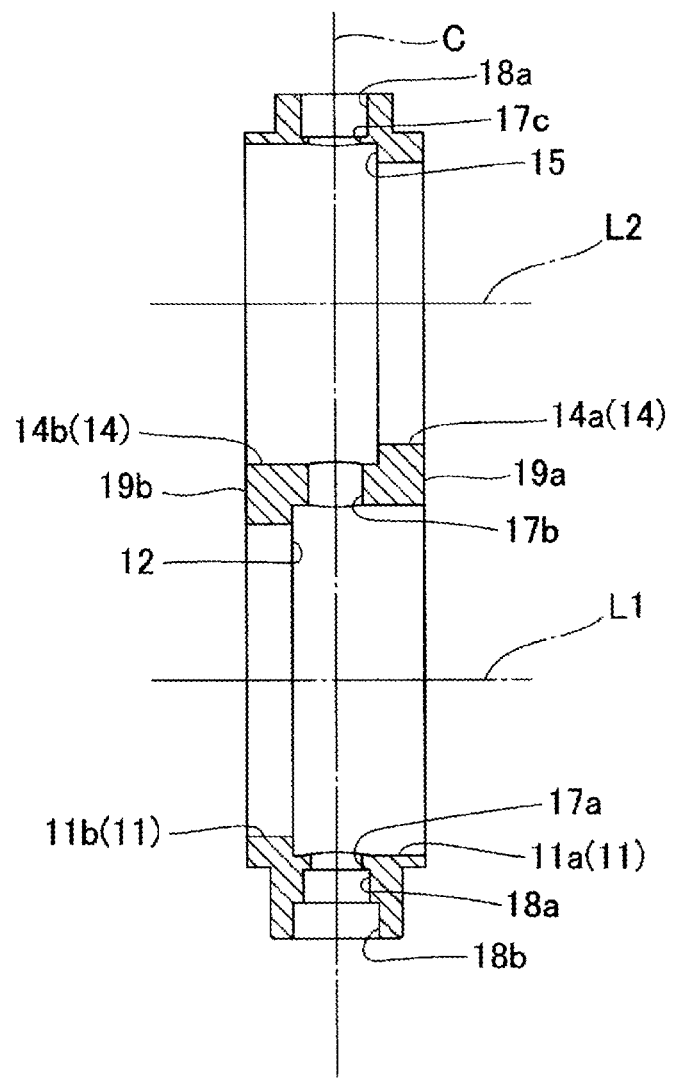
FIG. 5 is a sectional view of the body taken along E2-E2 in FIG. 4A.
Figure 6:
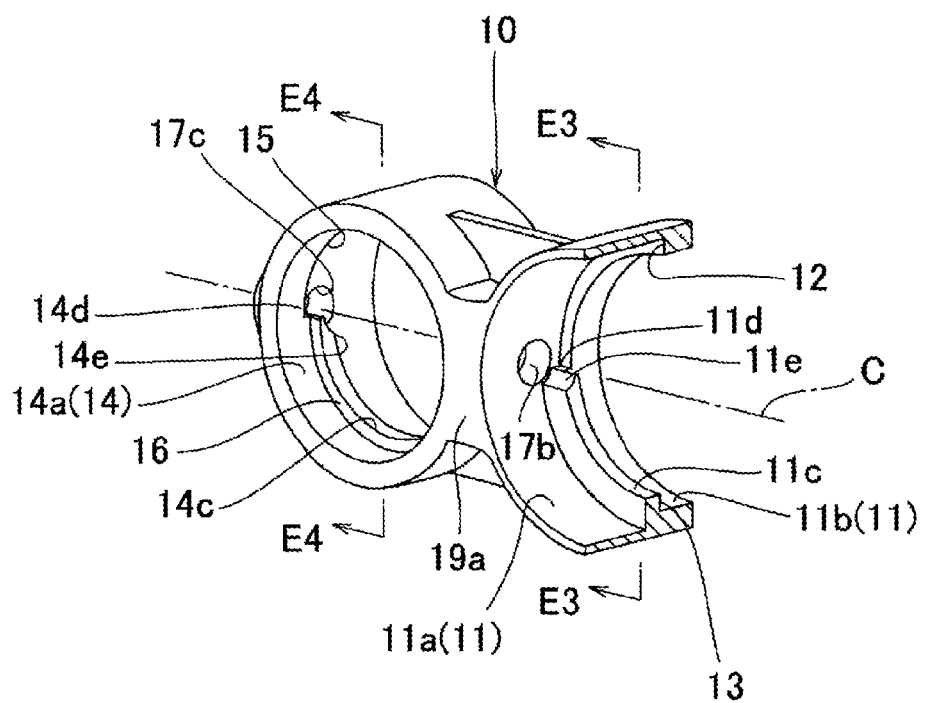
FIG. 6 illustrates a perspective view of the body that is included in the valve device illustrated in FIGS. 1A and 1B in such a manner that a part of the body is cut.

The main butterfly valve 30 includes the first contour part 31 and the second contour part 32 that are respectively disposed flanking the straight line CL that is parallel to the center line C, a straight line part 33, and a securing part 34, as illustrated in FIGS. 3A and 3B.

The first contour part 31 is formed into a semi-circular plate shape with a radius r1 (<D1/2) around the axial line L1 at the center.

The second contour part 32 is formed into a semi-circular plate shape with a radius r2 (<D2/2) that is smaller than the radius r1 around the axial line L1 at the center.

That is, the second contour part 32 is formed to have an outer contour that is smaller than the outer contour of the first contour part 31.

The straight line part 33 is formed to connect the outer contour of the first contour part 31 and the outer contour of the second contour part 32 on the straight line CL.

That is, since the first contour part 31 and the second contour part 32 are formed flanking the straight line CL that is parallel to the valve shaft 20 and passes through the center (axial line L1) of the main passage 11, and the straight line part 33 that connects both the outer contours is formed, it is possible to smoothly turn the main butterfly valve 30 while minimizing the amount of overhanging from the center line C of the valve shaft 20.

The securing part 34 is formed such that the main butterfly valve 30 is caused to deviate from the center line C of the valve shaft 20 by a prescribed distance and is secured to the valve shaft 20.

Various securing methods can be applied to the securing part 34 as long as the main butterfly valve 30 is turned along with the valve shaft 20 according to the fixing method. Examples thereof include a fastening method using a screw, a welding method such as spot welding, and a fusion method.

Then, the main butterfly valve 30 is adapted to close the main passage 11 on the downstream side beyond the valve shaft holes 17a, 17b, and 17c in a state in which the main butterfly valve 30 is secured to the valve shaft 20.

That is, if the main butterfly valve 30 rotates in a closing direction via the valve shaft 20, the surface outer edge 31a of the first contour part 31 is brought into contact with the first seal part 12, the surface outer edge 32a of the second contour part 32 is brought into contact with the second seal part 13, and the main passage 11 is closed at the position set apart from the valve shaft holes 17a, 17b, and 17c toward the downstream side of the main passage 11.

Here, since the main butterfly valve 30 is formed by the first contour part 31 that forms a prescribed outer contour and the second contour part 32 that forms an outer contour that is smaller than the first contour part, it is possible to provide the first seal part 12 and the second seal part 13 over the entire inner circumference of the main passage 11 while preventing interference of the main butterfly valve 30.

In this manner, it is possible to achieve a simple structure and the like and to prevent fluid leakage from the upstream side to the downstream side in a region in the vicinity of the valve shaft holes 17a and 17b when the main butterfly valve 30 is at the closing position, without leading to an increase in the number of components.

The sub butterfly valve 40 includes the first contour part 41 and the second contour part 42 that are disposed flanking the straight line CL that is parallel to the center line C, the straight line part 43, and the securing part 44 as illustrated in FIGS. 3A and 3B.

The first contour part 41 is formed into a semi-circular plate shape that has a radius r1' (<D2'/2) around the axial line L2 at the center.

The second contour part 42 is formed into a semi-circular plate shape that has a radius r2' (<D1'/2) that is smaller than the radius r1' around the axial line L2 at the center.

That is, the second contour part 42 is formed to have an outer contour that is smaller than the outer contour of the first contour part 41.

The straight line part 43 is formed to connect the outer contour of the first contour part 41 and the outer contour of the second contour part 42 on the straight line CL.

That is, since the first contour part 41 and the second contour part 42 are formed flanking the straight line CL that is parallel to the valve shaft 20 and passes through the center (axial line L2) of the sub passage 14, and the straight line part 43 that connects both the outer contours is formed, it is possible to smoothly turn the sub butterfly valve 40 while minimizing the amount of overhanging from the center line C of the valve shaft 20.

The securing part 44 is formed such that the sub butterfly valve 40 is caused to deviate from the center line C of the valve shaft 20 and is secured to the valve shaft 20.

Various fixing methods can be applied to the securing part 44 as long as the sub butterfly valve 40 is turned along with the valve shaft 20 according to the securing methods. Examples thereof include a fastening method using a screw, a welding method such as spot welding, and a fusion method.

Then, the sub butterfly valve 40 is adapted to close the sub passage 14 on the upstream side beyond the valve shaft holes 17a, 17b, and 17c in a state in which the sub butterfly valve 40 is secured to the valve shaft 20.

That is, if the sub butterfly valve 40 rotates in the closing direction via the valve shaft 20, the surface outer edge 41a of the first contour part 41 is brought into contact with the first seal part 15, the surface outer edge 42a of the second contour part 42 is also brought into contact with the second seal part 16, and the sub butterfly valve 40 closes the sub passage 14 at a position set apart from the valve shaft holes 17a, 17b, and 17c toward the upstream side of the sub passage 14.

Here, the sub butterfly valve 40 is formed by the first contour part 41 that forms a prescribed outer contour and the second contour part 42 that forms the outer contour that is smaller than the first contour part, it is possible to provide the first seal part 15 and the second seal part 16 over the entire inner circumference of the sub passage 14 while preventing interference of the sub butterfly valve 40.

In this manner, it is possible to achieve a simple structure and the like and to prevent fluid leakage from the upstream side to the downstream side in the region in the vicinity of the valve shaft holes 17b and 17c when the sub butterfly valve 40 is in the closing position, without leading to an increase in the number of components.

Figure 2:
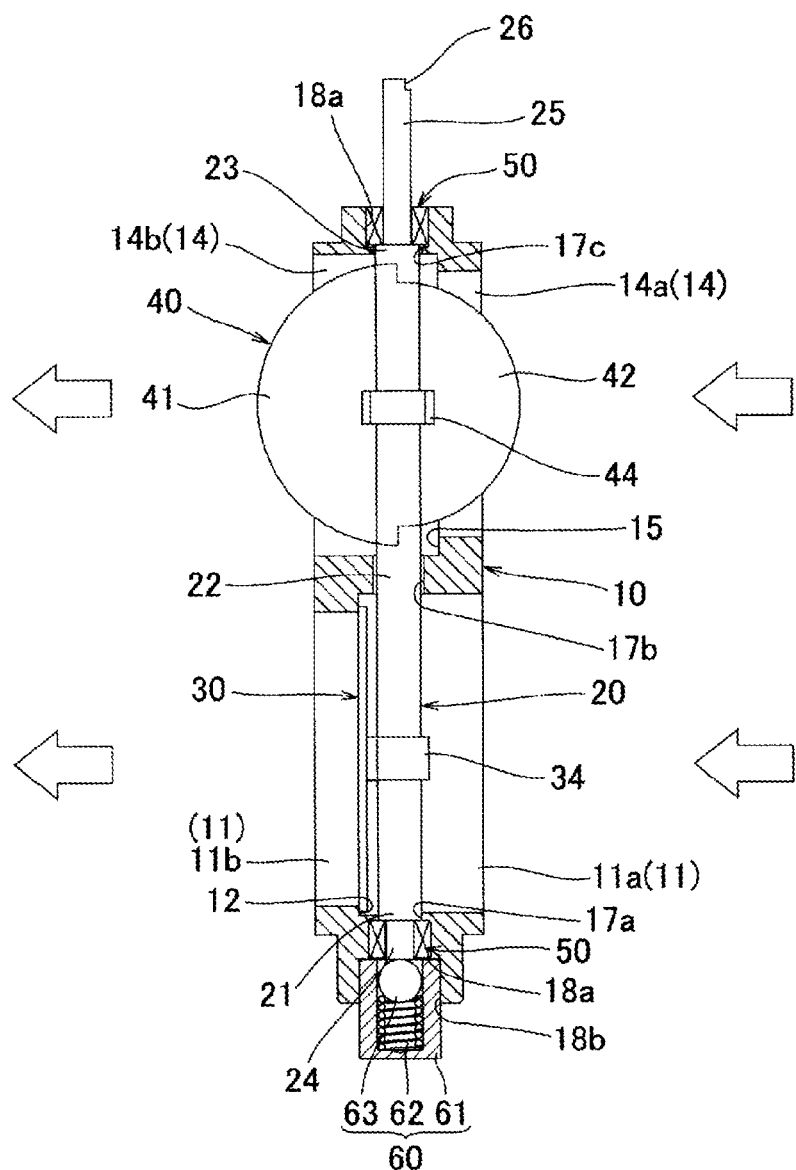
FIG. 2 is a sectional view of the valve device taken along E1-E1 in FIG. 1A.

The two bearings 50 are radial bearings and are adapted to support the reduced diameter parts 24 and 25 of the valve shaft 20, respectively, in a rotatable manner while fitted into the fitting holes 18a of the body 10 as illustrated in FIG. 2.

According to this, since the reduced diameter parts 24 and 25 on both sides of the valve shaft 20 are supported in a rotatable manner via the bearings 50 attached to the body 10, it is possible to more smoothly turn the valve shaft 20 as compared with a case in which the reduced diameter parts 24 and 25 are merely inserted into and supported by the valve shaft holes 17a and 17c.

Also, it is possible to prevent gaps from being created between the bearing 50 and the body 10 and between the valve shaft 20 and the bearing 50 by fitting the bearings 50 onto the body 10 and to thereby prevent the liquid from leaking to the outside of the body 10.

Note that the bearings 50, which is arranged on the side of the coupling part 26 (that is, outside the valve shaft hole 17c) of the valve shaft 20, of the two bearings 50 functions as the aforementioned radial bearing and also function as a thrust bearing of the valve shaft 20 by receiving the stepped surface between the other end part 23 of the valve shaft 20 and the reduced diameter part 25. Therefore, it is possible to further prevent the liquid from leaking to the outside.

The biasing member 60 includes the cylindrical holder 61 with a bottom, the spring 62, and the ball 63 as illustrated in FIG. 2.

The cylindrical holder 61 is formed to have an outer diameter dimension that is fixedly fitted to the attachment recessed part 18b of the body 10 or is formed to have a male spring that is screwed onto the attachment recessed part 18b.

The spring 62 is a coil-shaped spring and is formed to be fitted into the cylindrical holder 61 with a prescribed compression margin.

The ball 63 is arranged to be brought into contact with an end surface of the reduced diameter part 24 of the valve shaft 20 while receiving biasing force of the compressed spring 62.

According to this, it is possible to prevent rattling of the valve shaft 20 by localizing the valve shaft 20 on one side with biasing force of the biasing member 60 and to obtain desired opening and closing operations.

Here, a case in which a valve device M with the aforementioned configuration is applied to a waste heat collecting system S of an engine 1 will be described.

Figure 8:
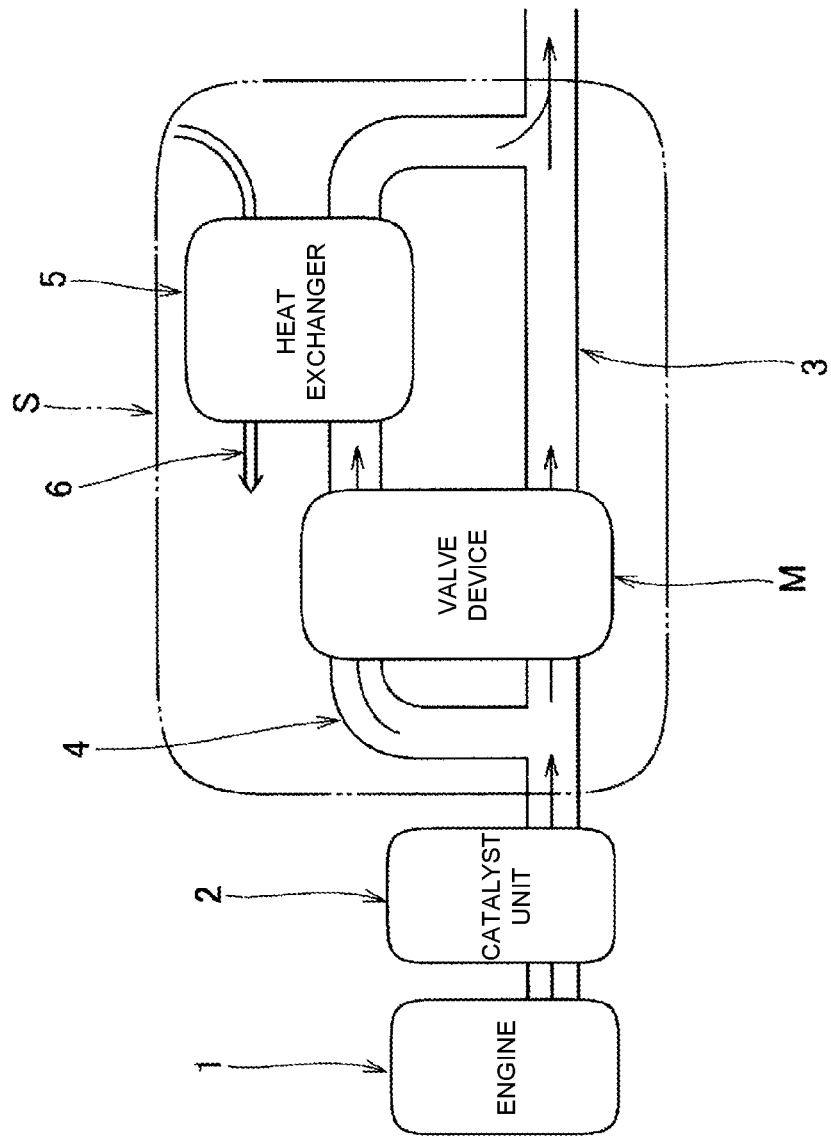
FIG. 8 is a schematic diagram in a case in which the valve device according to the present invention is applied to a waste heat collecting system for an engine.

The waste heat collecting system S includes a main exhaust pipe 3 that is connected on the downstream side of a catalyst unit 2 and causes exhaust to pass therethrough, a sub exhaust pipe 4 that is branched from the main exhaust pipe 3, the valve device M, a heat exchanger 5, and a pipe 6 through which cooling water is caused to pass in an exhaust system of the engine 1 as illustrated in FIG. 8.

Here, the main passage 11 is connected to the main exhaust pipe 3 while the sub passage 14 is connected to the sub exhaust pipe 4 in the valve device M.

Next, operations of the waste heat collecting system S to which the valve device M with the aforementioned configuration is applied will be described with reference to FIGS. 9A to 12B.

Figure 9A:
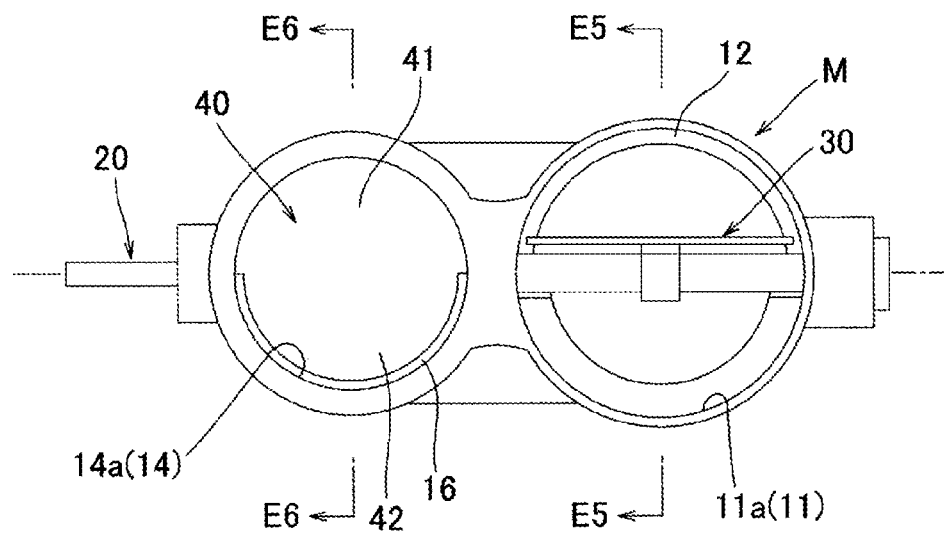
FIG. 9A illustrates an operation of the valve device according to the present invention and is a front view of the valve device in a state in which the main butterfly valve opens the main passage while the sub butterfly valve closes the sub passage.
Figure 9B:
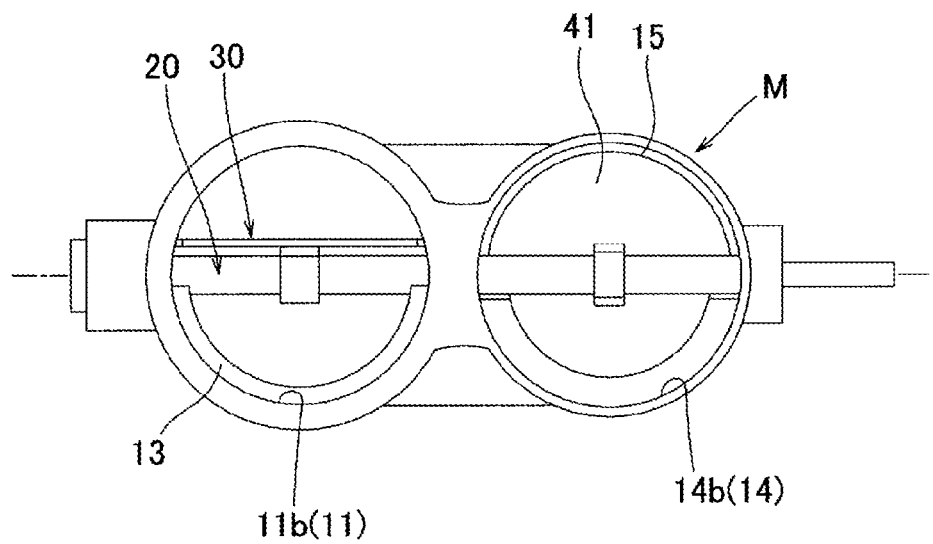
FIG. 9B illustrates an operation state of the valve device according to the present invention and is a back view of the valve device in a state in which the main butterfly valve opens the main passage while the sub butterfly valve closes the sub passage.
Figure 10A:
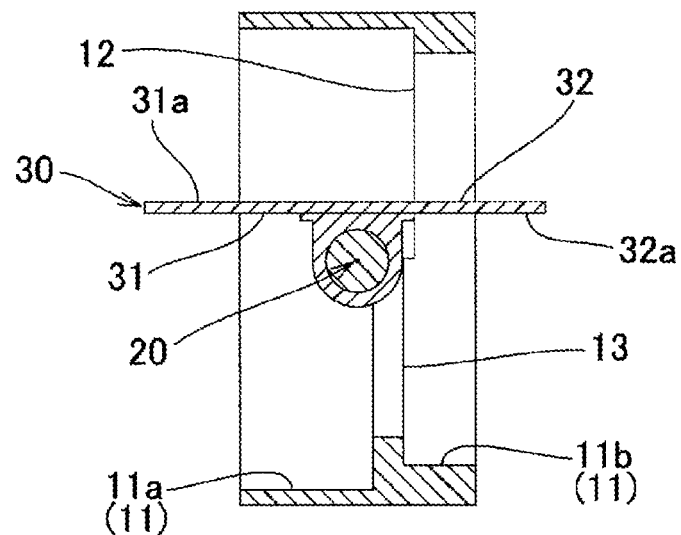
FIG. 10A is a sectional view of the valve device illustrated in FIG. 9A and is a sectional view taken along E5-E5 in FIG. 9A.
Figure 10B:
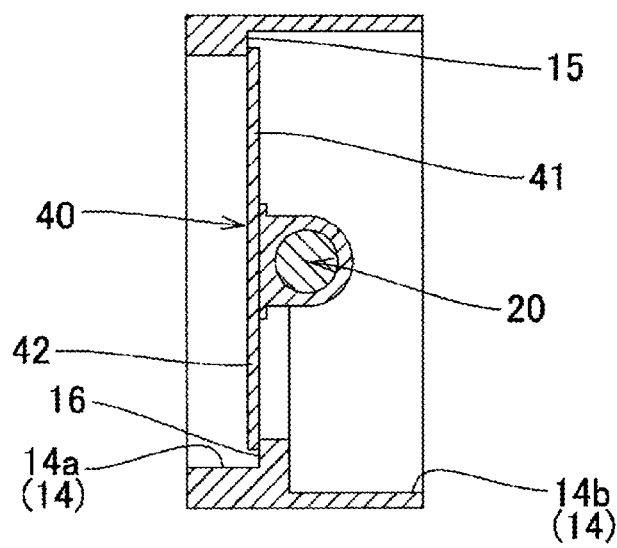
FIG. 10B is a sectional view of the valve device illustrated in FIG. 9A and is a sectional view taken along E6-E6 in FIG. 9A.

First, the main butterfly valve 30 is in a valve opening state in which the main passage 11 is opened as illustrated in FIGS. 9A, 9B, and 10A while the sub butterfly valve 40 is in a valve closing state in which the sub passage 14 is closed as illustrated in FIGS. 9A, 9B, and 10B, in an ordinary operation mode.

At this time, the exhaust from the engine 1 is smoothly discharged from the main exhaust pipe 3 to the outside through the main passage 11 of the valve device M.

Here, since the sub butterfly valve 40 closes the sub passage 14 on the upstream side beyond the valve shaft holes 17b and 17c, it is possible to prevent the exhaust directed from the main exhaust pipe 3 toward the side of the sub passage 14 from leaking outside through the valve shaft hole 17c.

Figure 11A:
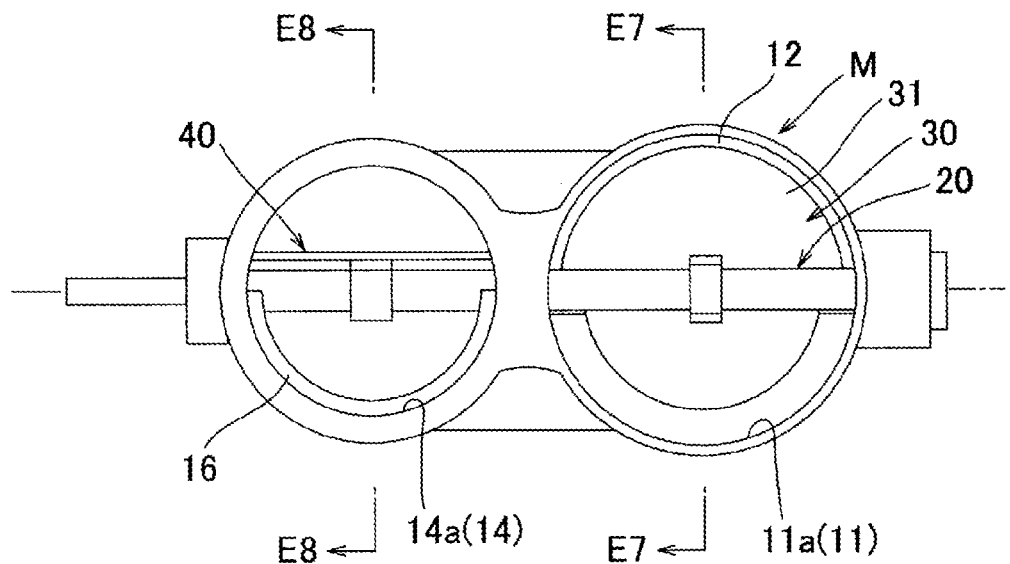
FIG. 11A illustrates an operation state of the valve device according to the present invention and is a front view of the valve device in a state in which the main butterfly valve closes the main passage and the sub butterfly valve opens the sub passage.
Figure 11B:
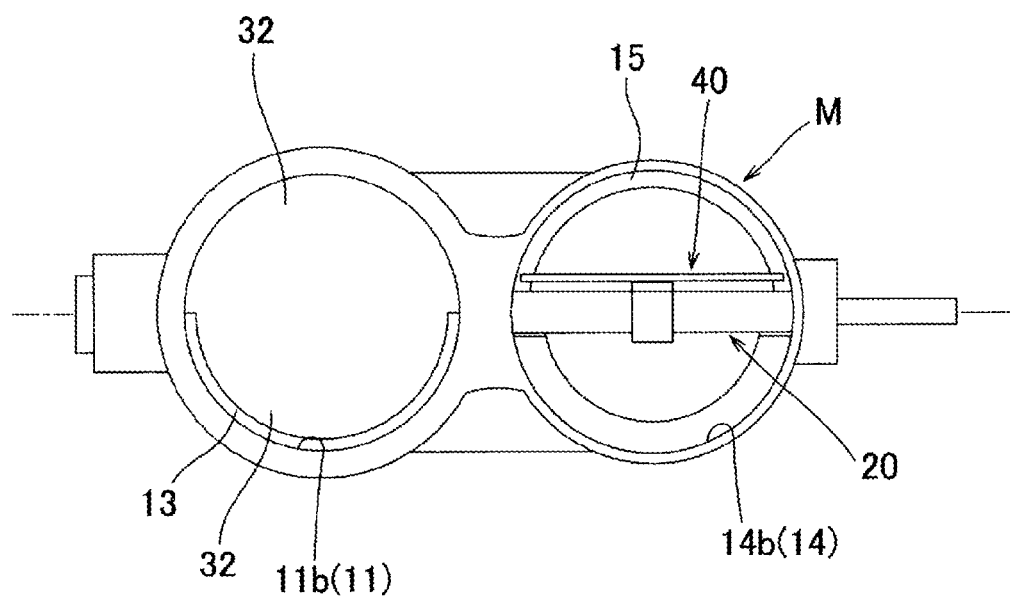
FIG. 11B illustrates an operation state of the valve device according to the present invention and is a back view of the valve device in a state in which the main butterfly valve closes the main passage and the sub butterfly valve opens the sub passage.
Figure 12A:
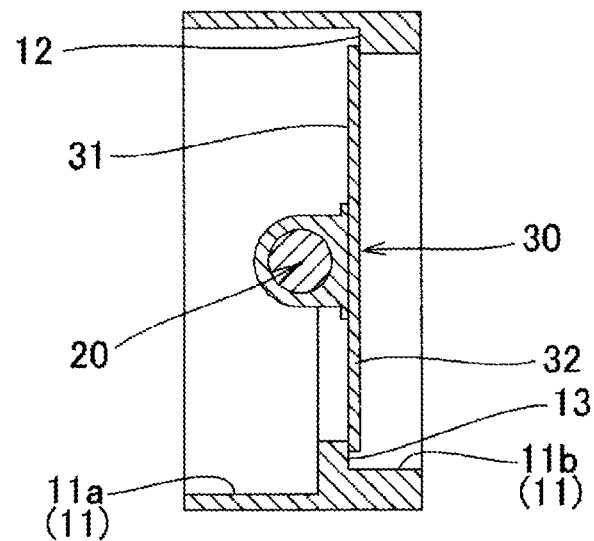
FIG. 12A is a sectional view of the valve device illustrated in FIG. 11A and is a sectional view taken along E7-E7 in FIG. 11A.
Figure 12B:
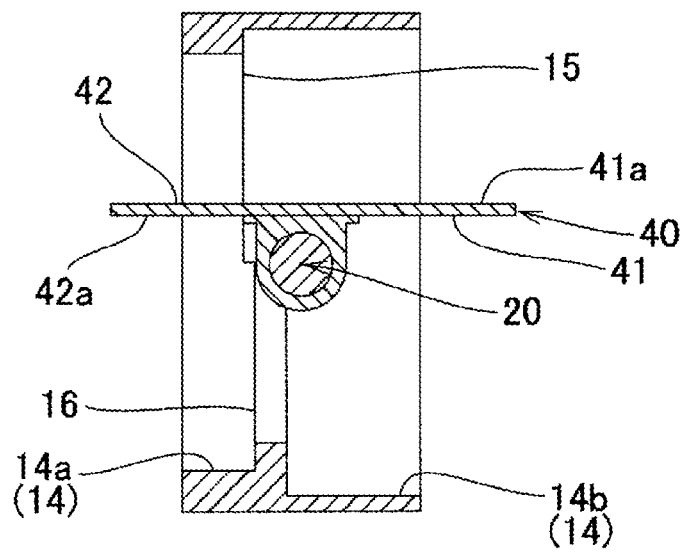
FIG. 12B is a sectional view of the valve device illustrated in FIG. 11A and is a sectional view taken along E8-E8 in FIG. 11A.

Meanwhile, the main butterfly valve 30 is in the valve closing state in which the main passage 11 is closed as illustrated in FIGS. 11A, 11B, and 12A while the sub butterfly valve 40 is in the valve opening state in which the sub passage 14 is opened as illustrated in FIGS. 11A, 11B, and 12B, in a waste heat collecting mode.

At this time, the exhaust from the engine 1 passes through the sub exhaust pipe 4 from the main exhaust pipe 3, advances through the heat exchanger 5, then returns to the main exhaust pipe 3, and is discharged to the outside.

Here, there is a case in which the pressure of the exhaust flowing inside the sub passage 14 increases due to flow resistance inside the heat exchanger 5 and the exhaust inside the sub passage 14 flows into the main passage 11 through a gap between the valve shaft hole 17b and the valve shaft 20.

In this case, since the main passage 11 is closed by the main butterfly valve 30 on the downstream side beyond the valve shaft hole 17b, the exhaust that has flown into the main passage 11 can be returned to the sub exhaust pipe 4 again without flowing toward the downstream side in the main exhaust pipe 3. Therefore, it is possible to effectively utilize the waste heat of the exhaust.

Although the case in which the valve device M according to the present invention is applied to the waste heat collecting system S of the engine 1 has been described above in the aforementioned embodiment, the present invention is not limited thereto, and the valve device M is also effective in a fluid adjustment system that adjusts a flow of another fluid other than exhaust.

Although the valve device M that includes the two passages (the main passage 11 and the sub passage 14) and the two butterfly valves (the main butterfly valve 30 and the sub butterfly valve 40) has been described above in the aforementioned embodiment, the present invention is not limited thereto.

Figure 13A:
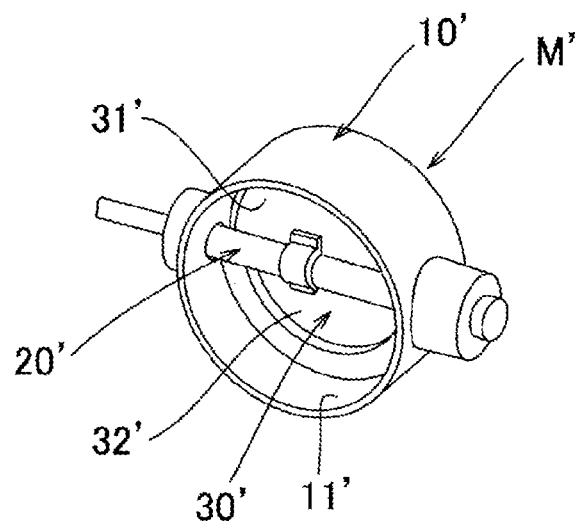
FIG. 13A illustrates another embodiment of the valve device according to the present invention that includes one passage and one butterfly valve and is an exterior perspective view of the valve device in a state in which the butterfly valve closes the passage.
Figure 13B:
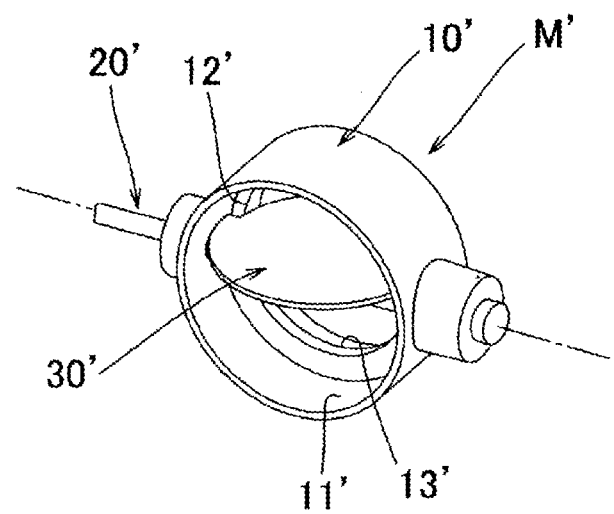
FIG. 13B illustrates another embodiment of the valve device according to the present invention that includes one passage and one butterfly valve and is an exterior perspective view of the valve device in a state in which the butterfly valve opens the passage.

For example, it is possible to employ a valve device M' that includes a body 10' that includes one passage 11' and a valve shaft 20' and one butterfly valve 30' that opens and closes the passage 11' as illustrated in FIGS. 13A and 13B.

Then, the vale device M' may employ a configuration in which the butterfly valve 30' incudes a first contour part 31' that forms a prescribed outer contour and a second contour part 32' that forms an outer contour that is smaller than the first contour part 31' and the body 10' includes a first seal part 12 with which the first contour part 31' is brought into contact in the passage 11' and a second seal part 13' with which the second contour part 32' is brought into contact.

In this case, the valve device M' that adjusts a flow of a fluid in one passage can be applied to a variety of fields.

Although the butterfly valves (the main butterfly valve 30, the sub butterfly valve 40, and the butterfly valve 30') in which both the first contour part and the second contour part are formed into semi-circular plate shapes have been described as the butterfly valves in the aforementioned embodiments, the present invention is not limited thereto.

That is, it is possible to employ butterfly valves in which both the first contour part and the second contour part are formed into semi-oval shapes or butterfly valves in which the first contour part and the second contour part are formed into other outer contour shapes as long as the butterfly valves include a first contour part that forms a prescribed outer contour and a second contour part that forms an outer contour that is smaller than the first contour part such that the first contour part and the second contour part are disposed flanking a straight line that is parallel to the valve shaft.

Although the case in which the straight line parts 33 and 43 that connect the outer contours of the first contour parts 31 and 41 and the outer contours of the second contour parts 32 and 42 are positioned on the straight line CL that is parallel to the valve shaft 20 and passes through the centers L1 and L2 of the passages 11 and 14 has been described in the aforementioned embodiment, the present invention is not limited thereto.

That is, a configuration may be employed in which the straight line parts disposed flanking the first contour parts and the second contour parts deviates from the centers (axial lines L1 and L2) in the direction vertical to the center line C of the valve shaft by a prescribed amount as long as the seal part is provided over the entire inner circumference of the passage.

In the embodiment, the case in which the main passage 11 that has the upstream-side passage 11a with a larger inner diameter and the downstream-side passage 11b with a smaller inner diameter is employed as the main passage and the sub passage 14 that has the upstream-side passage 14a with a smaller inner diameter and the downstream-side passage 14b with a larger inner diameter is employed as the sub passage has been described. However, the present invention is not limited thereto, and a main passage and a sub passage with the same inner diameters over the entire regions may be employed.

The invention claimed is:

1. A valve device comprising:
   a body that has a passage that a fluid is caused to pass through and a valve shaft hole;
   a valve shaft that passes through the valve shaft hole in a rotatable manner; and
   a butterfly valve that opens and closes the passage,
   wherein the butterfly valve includes a first contour part and a second contour part that forms an outer contour that is smaller than an outer contour of the first contour part, the first contour part and the second contour part are secured to the valve shaft to close the passage at a position set apart from the valve shaft hole toward an upstream side or a downstream side of the passage, and are disposed to flank a straight line parallel to the valve shaft to form prescribed outer contours, and the butterfly valve includes a straight line part that connects the outer contour of the first contour part and the outer contour of the second contour part, wherein the straight line part is positioned on the straight line that is parallel to the valve shaft and passes through a center of the passage, and
   the body includes a first seal part with which the first contour part is brought into contact, a second seal part with which the second contour part is brought into contact within the passage, and a flat part with which the straight line part of the butterfly valve is brought into close contact during closure of the passage.

2. The valve device according to claim 1,
   wherein the passage is formed to have a circular section with a prescribed center,
   the first contour part s formed into a semicircular plate shape with a prescribed radius, and the second contour part is formed into a semicircular plate shape with a smaller radius than the radius of the first contour part.

3. The valve device according to claim 1, wherein the body has a relief part that is formed into a curved shape and is continuous with the flat part along an outer circumferential surface of the valve shaft in the vicinity of the second seal part.

4. The valve device according to claim 1, wherein the body has a main passage and a sub passage that serve as the passage and the valve shaft hole that is formed to cause the main passage and the sub passage to communicate with each other, a main butterfly valve that serves as the butterfly valve for opening and closing the main passage and a sub butterfly valve that serves as the butterfly valve for opening and closing the sub passage in a phase opposite to a phase of the main butterfly valve are secured to the valve shaft, the main butterfly valve is arranged to close the main passage at a position set apart from the valve shaft hole toward a downstream side of the main passage, and the sub butterfly valve is arranged to close the sub passage at a position set apart from the valve shaft hole toward an upstream side of the sub passage.

5. The valve device according to claim 1, wherein the valve shaft is supported at both ends thereof in a rotatable manner via bearings attached to the body.

6. The valve device according to claim 1, further comprising:
a biasing member that biases the valve shaft toward one side in an axial direction thereof.

* * * * *